3,083,157
FILTER CONSTRUCTION
James S. Krueger, 1404 Summit Road, Berkeley, Calif.
No Drawing. Filed May 21, 1959, Ser. No. 814,661
4 Claims. (Cl. 210—505)

This invention relates to improvements in filters, and more particularly to an improved filter for low viscosity liquids and a method for producing such filter.

An object of this invention is to provide a filter capable of removing bacteria and yeast and the like from low viscosity liquids to produce a sterile filtrate.

Another object of this invention is to provide a filter which is capable of removing suspended material from low viscosity liquids to produce a crystal-clear filtrate.

Still another object of this invention is to provide a filter of the character described capable of withstanding pressures up to 60 pounds per square inch without disintegrating.

A further object is to provide a filter of the character described for the filtration of low viscosity liquids which has no effect upon the taste, color or odor of the liquid filtered.

A still further object is to provide a method for making a filter of the character described into which is directly incorporated asbestos fiber coated in uniform fashion with diatomaceous earth.

Other objects and advantages of this invention will become apparent from the description which follows.

The filter of this invention is of a type which relies upon a sieve action for effecting the removal of suspended materials from low viscosity liquids, and is limited in its application to fluids having viscosities of less than S.A.E. 5. It is therefore particularly well suited for filtering dextrose, alcohol, and saline solutions, and vaccines, where removal of particles of a size 0.3 micron or larger is a requirement. The filter accomplishes the above filtration without the use of any auxiliary filtering apparatus, other than is necessary for its mere support, and has considerable structural strength, being capable of withstanding pressures up to 60 pounds per square inch without disintegrating. Due to its ability to remove extremely small particles from suspension in low viscosity or water-bearing liquids, the filter is particularly suitable for eliminating bacteria, yeasts, mold and the like to produce clear and sterile filtrates. Important in achieving this result is the absence of any effect upon the taste, color or odor of the liquids undergoing filtration.

In practice this filter has been found effective to remove from a liquid living cultures of Streptococcus, Staphylococcus and *Bacillus globigii;* and where a liquid containing such living cultures in the order of 1,000,000 organisms per milliliter has been subjected to a single pass through the filter of this invention and the resultant filtrate inoculated into a nutrient broth and into a nutrient agar, no growth has been observed after incubation of these medias for a period of five days.

Inasmuch as the filter is directed toward the removal of suspended foreign matter of a relatively fine particle size through sieve action, it is extremely important that the porosity of the filter be closely controlled to permit satisfactory passage of the filtered liquid while at the same time assuring the retention of the foreign matter upon the filter. To achieve such porosity control, asbestos fiber and diatomaceous earth of predetermined size are intimately intermixed by blending and thereupon incorporated directly into the filter as its sole operative ingredients. "Blending" as the term is utilized herein describes the intimate intermixing of the asbestos fiber and the diatomaceous earth through a fiber separating and shredding operation, being typically effected by means of apparatus incorporating rapidly rotating blades in the manner of the Oster and Waring food blenders utilized for the physical reduction of foodstuffs.

It is important that the major portion of the asbestos after completion of the blending operation be of a fiber length within the range of from 5 to 7 millimeters and preferably of a diameter in the vicinity of one ten thousandth millimeter. Lesser fiber length results in a filter which is too tight to permit satisfactory passage of liquid through the filter and greater fiber length increases the porosity of the filter preventing adequate filtration of the fine matter suspended in the fluid being filtered. Further, it is essential that the diatomaceous earth be of a size within the range of from 2 to 50 microns for the achievement of proper porosity. A suitable diatomaceous earth for this purpose is commercially available from Johns-Manville under the name of "Supercel."

The ability of the filter of this invention to function effectively is believed to result from the uniform coverage of asbestos fiber with diatomaceous earth and the hygroscopic nature of each of these materials, i.e., their tendency in operation to absorb moisture and thereby assume an increased size, reducing the filter interstices to dimensions suitable for effective filtration. It is essential that the filter be wetted prior to its use to achieve the proper interstices dimensions through such hygroscopic effect, and such wetting will normally be accomplished incident to initial sterilization of the equipment within which the filter or filters are disposed. It is further important that no additives, such as resins, be incorporated into the filter which will impede the above hygroscopic action of the asbestos fiber and the diatomaceous earth.

Referring now to the procedure for making the above filter, under the method of this invention the asbestos fiber is first subjected to blending with diatomaceous earth for the purpose of effecting separation and shredding of the asbestos fiber and its thorough and intimate intermixing with the diatomaceous earth. A liquid such as water is utilized to facilitate the blending operation which must be continued until the major portion of the asbestos fiber is reduced to lengths substantially within the range of from 5 to 7 millimeters for reasons heretofore indicated.

For certain applications it may be desirable that the calcium content in the filter be limited and accordingly the asbestos fiber may be treated before blending with hydrochloric acid and thereafter washed to reduce its calcium content to a satisfactory level. Such pretreatment is optional and forms no part of this invention.

It is preferable that the asbestos fiber initially subjected to blending be of "filter grade," i.e., of a fiber length of approximately ½ to ¾ inch. Such fiber is typically available in a fluffy bundle state in which the individual fibers are only partially separated, and the fiber in this condition may be subjected directly to the above blending operation.

It is essential that the diatomaceous earth be of a size of from 2 to 50 microns passing through a 150 mesh screen once leaving 7% maximum. Best results are achieved if the asbestos fiber and the diatomaceous earth are mixed in the approximate proportion of 1 pound of asbestos to 90 grams of diatomaceous earth. The amount of water or other liquid used to facilitate blending is not critical and may be varied to suit the particular operation, however for batch blending a quantity of 4 gallons of water when added to a mixture of 1 pound of asbestos fiber and 90 grams of diatomaceous earth has proven satisfactory. It has been found that 400 milliliters of such a mixture should, in batch-type blending be subjected to the action of a blender of the Oster or Waring type for a period of approximately 2 minutes. Where blending is accomplished through continuous flow of the mixture with the blender blades being interposed in the path thereof, the necessary time for exposure of the mixture to such blades is considerably reduced, and a time of approximately 1 second may be satisfactory for adequate blending.

The next step in the method of this invention consists of screening the asbestos-diatomaceous earth blend to remove the blending liquid therefrom. This step is preferably accomplished by applying a vacuum opposite the screen supported blend to draw off such liquid, leaving the filter pad product upon the screen. The screen size may be varied in accordance with the size and thickness of the pad desired. It should be noted that decanting is not a suitable means for eliminating the blending liquid.

Finally, the deliquified pad is dried in a conventional manner, either naturally or by artificial means. In connection with the latter method of drying, it should be mentioned that where application of heat to a pad of relatively large size is too rapid, a ripple in the pad may result. After drying, the filter pad is ready for use and may be utilized singly or in combination with other such pads for both gravity and pressure filtration in laboratory use and in large-scale filtering operations where clean and sterile filtrates are desired. It should be noted that no extraneous filter aids, backing felts or auxiliary mechanical apparatus are necessary to the filtering action of the pad. Filter pad support may be by conventional means such as screens in the laboratory or by perforate plates or the like in large-scale filtering operations. The pads may be varied in thickness and in area to suit demands, although a pad of approximately ⅛ inch thickness has proved satisfactory for laboratory use.

I claim:

1. A filter for low viscosity liquids consisting essentially of asbestos fibers having a diameter of about 1 micron and lengths within the range of from about 5 to 7 millimeters intimately mixed with diatomaceous earth of a size within the range of from about 2 to 50 microns, the weight of said asbestos being about 5 times the weight of said diatomaceous earth.

2. A self-supporting filter pad for low viscosity liquids consisting essentially of asbestos fibers having lengths within the range of about 5 to 7 millimeters intimately intermixed with diatomaceous earth, having a particle size within the range of from about 2 to 50 microns and with said asbestos constituting at least about 75 percent of the weight of the filter, said filter being characterized by the ability when wetted to provide very small filter interstices responsive to hygroscopic swelling of the constituents of said filter.

3. The method of making a filter for low viscosity liquids which comprises preparing a mixture consisting essentially of asbestos fibers, diatomaceous earth having a particle size within the range of 2 to 50 microns, and a volatile liquid with said asbestos fibers constituting at least about 75 percent of the combined weight of asbestos and diatomaceous earth; subjecting said mixture to blending and shredding for a sufficient time to produce a substantially uniform distribution having individual fibers therein with lengths within the range of 5 to 7 millimeters; and removing said liquid from said distribution to produce a self-supporting filter pad consisting essentially of said diatomaceous earth and said fibers.

4. The method of making a filter for low viscosity liquids which comprises preparing a mixture consisting essentially of diatomaceous earth of a particle size within the range of 2 to 50 microns, asbestos fibers having fiber lengths within the range of one-half to three-quarters of an inch and in an amount of at least about three parts by weight per part by weight of diatomaceous earth, and a volatile liquid; subjecting said mixture to blending and shredding for a sufficient time to produce a substantially uniform distribution having individual fibers therein with lengths within the range of 5 to 7 millimeters; screening said distribution to remove therefrom a substantial portion of said liquid to thereby form a filter pad consisting essentially of said diatomaceous earth, said fibers, and a minor portion of said liquid, and finally drying said pad.

References Cited in the file of this patent

UNITED STATES PATENTS

| 1,336,591 | Shull | Apr. 13, 1920 |
| 1,416,266 | Clapp | May 16, 1922 |
| 2,349,469 | Sloan | May 23, 1944 |
| 2,614,655 | Katz | Oct. 21, 1952 |
| 2,747,994 | Hoopes | May 29, 1956 |
| 2,797,163 | Smith et al. | June 25, 1957 |

FOREIGN PATENTS

| 467,216 | Canada | Aug. 8, 1950 |

OTHER REFERENCES

"Celite Diatomite Products," Johns-Manville brochure FA-42A (July 1956) (4 pages).

Condensed Chemical Dictionary (edited by Turner), revised by Rose, 4th ed. (1950), published by Reinhold Publishing Co., N.Y., page 220 entry under diatomaceous earth.